INVENTORS
Meyer Marks
Ray B. Schrecongost
By [signature]
ATTORNEY

April 10, 1962 M. MARKS ET AL 3,029,305

REMOTE CONTROL SYSTEMS

Filed March 23, 1959 2 Sheets-Sheet 2

INVENTORS
Meyer Marks
Ray B. Schrecongost
By John T. Negreffe
ATTORNEY

United States Patent Office 3,029,305
Patented Apr. 10, 1962

3,029,305
REMOTE CONTROL SYSTEMS

Meyer Marks, Clarendon Hills, and Ray B. Schrecongost, Park Ridge, Ill., assignors to Admiral Corporation, Chicago, Ill., a corporation of Delaware Filed Mar. 23, 1959, Ser. No. 801,280
6 Claims. (Cl. 178—5.8)

This invention relates in general to a control system for remotely initiating the tuning operation of a radio receiver apparatus of the "signal seeking" type.

In accordance with the present invention, an ultra-sonic "start" signal is used to initiate operation of the motor driven tuning device of the controlled apparatus. When the controlled apparatus is tuned to a transmitted signal, a "stop" signal is sent to the control system to terminate operation of the tuning device. The "stop" signal can, of course, be triggered by any portion of the controlled apparatus which is capable of indicating the presence of a transmitted signal.

The invention as described below is shown in conjunction with a television receiver but it will be appreciated that this is merely for purposes of illustration and the invention may advantageously be used to control any tunable radio receiver apparatus. In the drawings, the synchronizing signal separator section of a television receiver is employed to provide the "stop" signal but this choice will be recognized as merely one of convenience.

It is a primary object of this invention to provide a control system which is remotely actuated by control signals having predetermined characteristics for tuning a radio receiver apparatus of the "signal seeking" type.

A more particular object of this invention is to provide a "signal seeking" control system which is actuated by ultra-sonic wave signals to automatically tune a television receiver to the next suceeding "live" channel.

A feature of this invention is the provision of a holding circuit having a predetermined maximum holding time to automatically deenergize the tuner drive motor when no "live" channels are present.

Another feature of this invention is incorporated in circuitry for keeping the "stop" signal detector disconnected from the relay control tube except when the tuning motor is running to thereby obviate the "stop" signal detector's switching on the control tube responsive to noise, airplane flutter etc.

This invention will best be understood by reading the specification in conjunction with the drawings in which.

Figure 1:
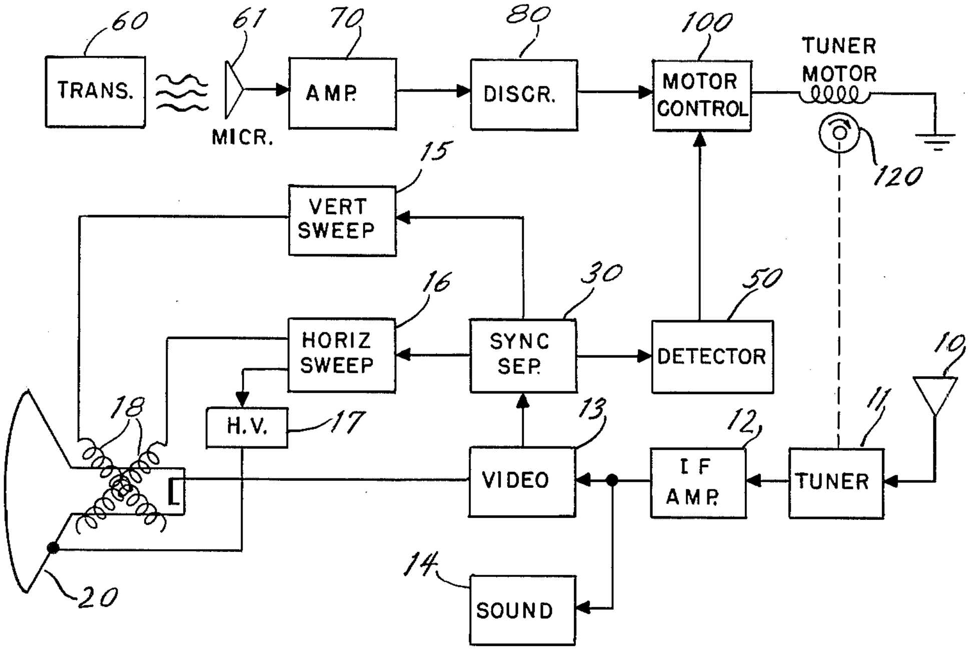
FIG. 1 represents in block form a television receiver and a control circuit embodying the invention.

Referring now to FIG. 1 antenna 10 couples television signals to tuner 11 where they are heterodyned in a well known manner. The resulting intermediate frequency signal is coupled to IF amplifier 12 and thence to video section 13 and sound section 14. The output of video section 13 is coupled to cathode ray tube 20 and synchronizing signal separating circuit 30, hereafter referred to as synch separator 30. Vertical sweep circuit 15 and horizontal sweep circuit 16 are fed from sync separator 30 and provide the necessary deflection voltages for deflection coils 18 located on cathode ray tube 20. Horizontal sweep circuit 16 additionally drives high voltage circuit 17 which provides the necessary high accelerating voltage for cathode ray tube 20. This television receiver arrangement is well known in the art and therefore details of the circuitry will not be given.

The control system in FIG. 1 comprises transmitter 60, receiver 61, amplifier 70, discriminator 80, motor control circuit 100 and tuner motor 120. Tuner motor 120 is mechanically coupled to tuner 11 in the television receiver as indicated by the dashed lines joining these components. Tuner 11 may be of any type, but is preferably of the "incremental type" which sequentially tunes, at fixed points in its operating path, the plurality of television signals coupled via antenna 10. Sync separator 30 is coupled to a detector network 50, the output of which is connected to motor control 100.

In operation a channel selection signal from transmitter 60 is received by microphone 61, amplified by amplifier 70 and routed by discriminator circuit 80 to motor control 100 which actuates tuner motor 120. As tuner motor 120 operates, it rotates tuner 11 over its tuning range. When tuner 11 tunes in a "live" channel, the synchronizing components of the received television signal are separated by sync separator 30 and fed to detector 50. Detector 50 contains circuitry which is effective to deenergize motor control circuit 100 responsive to the presence of these synchronizing components. Consequently, tuner 11 is stopped whenever it tunes in a "live" channel. In the event that there are no "live" channels additional circuitry is provided in motor contorl 100 to prevent continuous operation of tuner motor 120.

Figure 2:
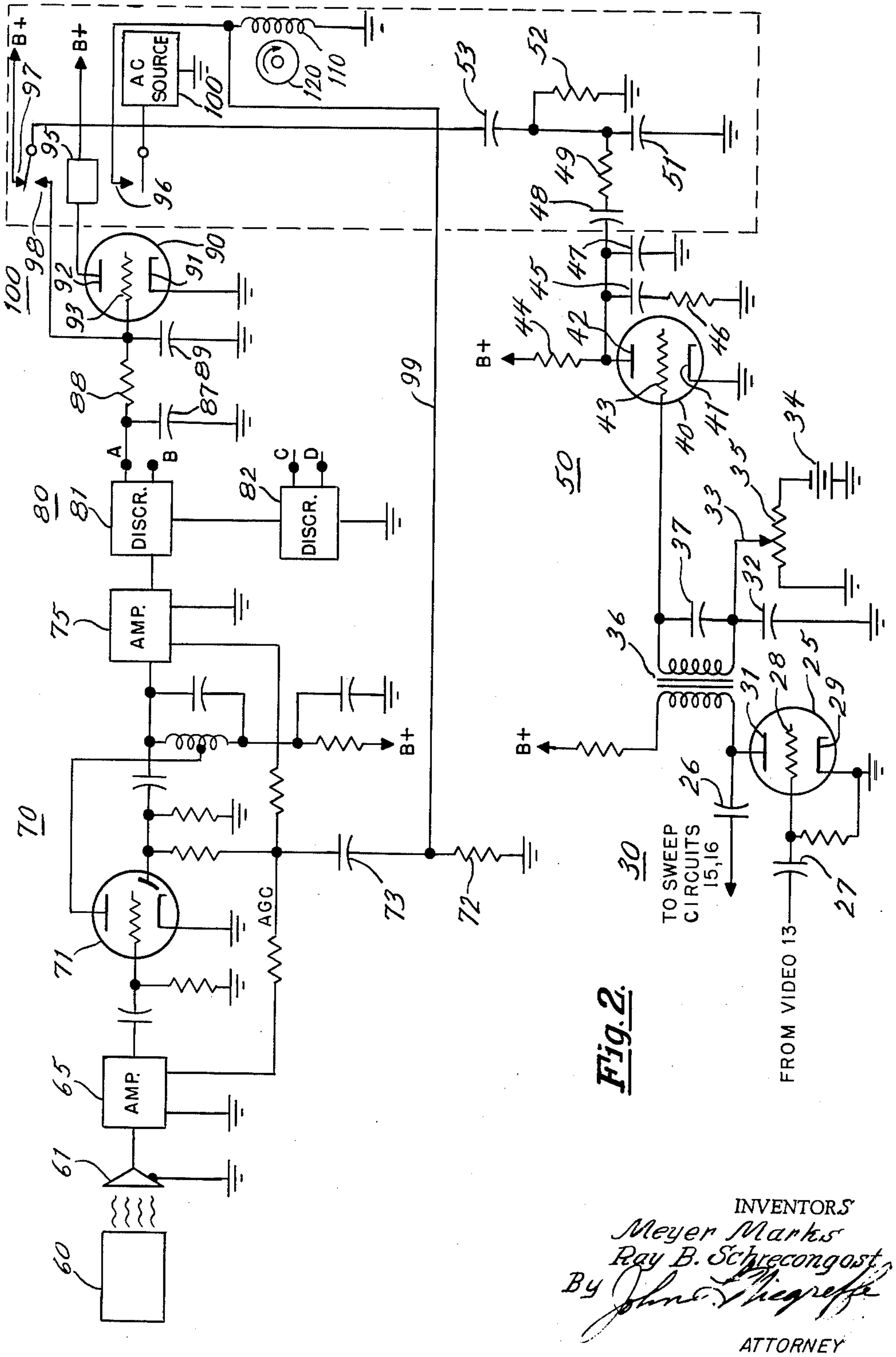
FIG. 2 illustrates a partial schematic diagram of the block diagram of FIG. 1.

Referring now to FIG. 2, it will be noted that sync separator circuit 30, detector 50 and motor control 100 are shown in detail. Control amplifier 70 is shown in partial block and partial schematic form and comprises amplifiers 65, 71 and 75. Amplifier 70 serves not only to amplify signals received by microphone 61 but also provides automatic gain control to insure that these received signals have substantially constant amplitude at the output of amplifier 75. This arrangement is completely described in a co-pending application of Meyer Marks, Serial No. 799,901, filed March 17, 1959.

For purposes of illustration it will be assumed that transmitter 60 comprises means for producing any one of four distinct ultra-sonic signals of predetermined minimum duration and amplitude. Each signal is designed to control a particular function of the wave signal receiving apparatus, for example a television receiver. For simplicity, only the channel selection control function circuitry is shown.

It should be understood that the invention is not confined to the use of ultra-sonic control signals but that any wave energy signals could be employed as well.

Assume that a channel selection signal is transmitted by transmitter 60. This signal is received by microphone 61 and amplified by amplifier 70. The output of amplifier 70, which as described previously is relatively constant, is coupled to discriminator circuit 80 which comprises serially connected discriminators 81 and 82. Discriminator 81 has an output A and an output B and discriminator 82 has an output C and an output D. In response to the channel selection signal, output A of discriminator 81 for example, swings positive and begins to charge the capacitors in the integrating network which comprises resistor 88 shunted to ground on either side by capacitors 87 and 89. This integrating network acts to time the duration of the signal from transmitter 60 which effectively discriminates against noise impulses lying within the frequency range since they are generally of relatively short duration. The integrating network places a positive voltage on grid 93 of relay tube 90 when a signal of a predetermined minimum duration has been transmitted. Tube 90 is rendered conductive between its cathode 91 and plate 92 and operates relay 95 which is connected in its plate circuit. Relay 95 in operating closes contact 96 which connects a grounded source of A.C. potential 100 to tuner motor winding 110.

The A.C. voltage from source 100 is placed on damping lead 99, also connected to tuner motor winding 110, and appears at the junction of capacitor 73 and resistor 72 in amplifier 70. The A.C. voltage is rectified by the diode element in tube 71 which places a large negative potential on the A.G.C. lead during the time the voltage is applied. This large bias on the A.G.C. lead disables amplifier 70. Additionally, capacitor 73 develops a strong negative charge which is effective to hold amplifier 70 substantially disabled for a fixed period of time after the A.C. voltage on damping lead 99 is removed. This disabling action prevents "channel overshoot" upon receipt of a very strong channel selection signal from transmitter 60 and is fully described in the previously mentioned co-pending application of Meyer Marks.

Normally closed contact 97 of relay 95 connects a source of positive voltage B+ to the grounded series combination of capacitor 53 and resistor 52, and thus capacitor 53 is normally in a charged state. When relay 95 operates, capacitor 53 is connected via contact 98 to grid 93 of relay tube 90 and holds tube 90 conductive for predetermined maximum period of time. This time period is determined by the relative values of capacitor 53 and resistor 52 and in practice is made large enough to insure that tuner motor 120 will operate tuner 11 (not shown) through its complete range. In the event that no television signals are present, tuner motor 120 will be automatically stopped following the predetermined discharge time of capacitor 53, thus preventing its futile operation.

Looking now at sync separator 30, a synchronizing separator tube 25 having a cathode 29, a plate 31 and a grid 28 is provided. Grid 28 is fed from video circuit 13 through a capacitor 27. Plate 31 is resistively coupled to a source of potential B+ through a transformer 36. Plate 31 is connected through capacitor 26 to the horizontal and vertical sweep circuits 16 and 15, respectively. This arrangement, with the exception of transformer 36, which does not affect the sync separator action, is well known in the art and functions to separate the synchronizing components from the video signal impressed on grid 28. The synchronizing components appearing in the primary winding of transformer 36 are coupled by the secondary winding of transformer 36 to detector 50.

The secondary of transformer 36 is bridged by a capacitor 37 and together they comprise a tuned circuit which is tuned to a harmonic of the horizontal synchronizing pulse frequency. It was found that enhanced operation was achieved by tuning this combination to a low order harmonic (the third-fifth harmonics proved satisfactory) of the horizontal synchronizing pulse frequency.

Tube 40 in detector 50 includes a plate 42 connected through a resistor 44 to a positive source of potential B+, a grid 43 connected to the secondary of transformer 36, and a grounded cathode 41. The junction of plate 42 and resistor 44 is connected to the common junction of capacitors 45, 47 and 48. The other terminal of capacitor 45 is connected to a grounded resistor 46. The other terminal of capacitor 47 is grounded and the remaining terminal of capacitor 48 is connected through a resistor 49 to a grounded capacitor 51. The junction of resistor 49 and capacitor 51 is tied to the junction of capacitor 53 and resistor 52 which, as previously mentioned, determine the maximum operating time of tube 90.

Tube 40 is held non-conductive when no television signals are present by a negative potential on grid 43. This potential is obtained, through the secondary winding of transformer 36, from adjustable tap 33 on resistance 35 which resistance is connected to a negative potential source 34. Capacitor 32 acts as a bypass to ground for signals appearing across the secondary winding of transformer 36. In practice tap 33 is adjusted such that, with no signal, tube 40 is cut off. This is the point of maximum sensitivity.

The presence of synchronizing components of the received television signal in the primary of transformer 36 drives grid 43 positive. Tube 40 conducts and a negative voltage pulse appears at the junction of plate 42 and resistor 44. Capacitors 45 and 47, and resistor 46 are instrumental in determining the transient characteristics of this pulse or output signal. The pulse is coupled by capacitor 48 to resistor 49 and capacitor 51 which helps to shape the pulse. The pulse is then coupled, via capacitor 53 and contact 98 to grid 93 of tube 90 and is effective to cut tube 90 off. When tube 90 is cut off, relay 95 restores. Upon restoration of relay 95, motor 120 is deenergized.

To recapitulate, responsive to a channel selection signal from transmitter 60, tuner motor 120 is operated to drive tuner 11 (not shown) until synchronizing components appear in the output of sync separator tube 25 which, of course, occurs only when a television signal is received by tuner 11. Responsive to these synchronizing components, a negative pulse is produced at the plate of detector tube 40 and is coupled to grid 93 on tube 90. Tube 90 is cut off by this pulse, relay 95 restores and tuner motor 120 is deenergized thus stopping rotation of the tuner.

It will be noted that detector 50 is not connected to tube 90 except when relay 95 is operated. This arrangement prevents operation of the tuner as a result of signals of the wrong polarity generated by tube 40 in response to noise etc., which in effect would look like "start" signals to tube 90.

Figure 3:
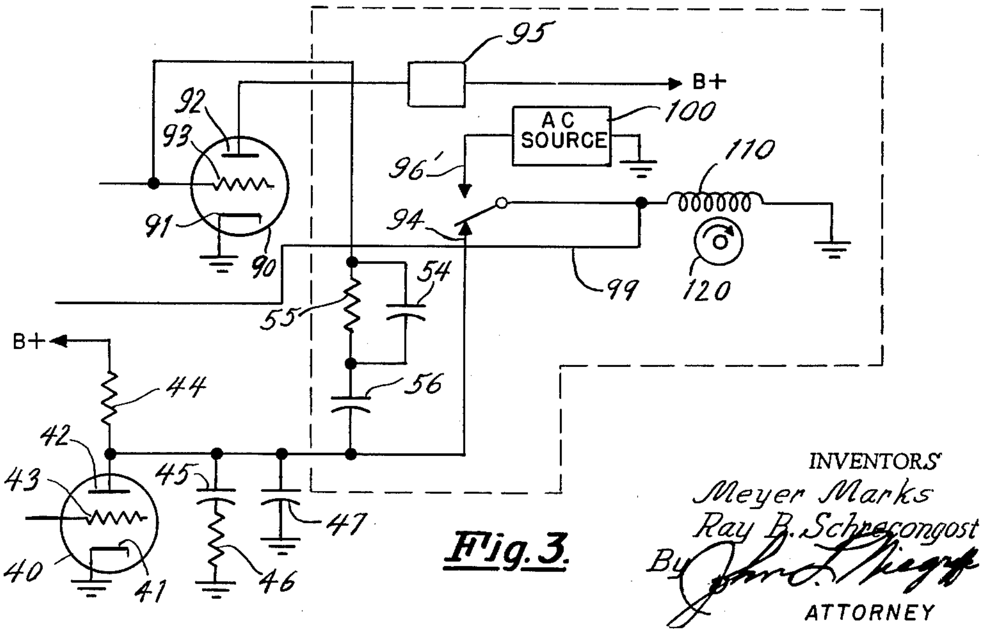
FIG. 3 represents a modification of the portion of the schematic diagram of FIG. 2 which is enclosed by the dashed lines.

In FIG. 3 a simplified switching circuit is shown. The portion of FIG. 2 enclosed by the dashed lines is reproduced in FIG. 3 and like reference characters are used in indicate like components. The simplification consists in the main of eliminating a set of contacts on relay 95. In FIG. 3, grid 93 of tube 95 is serially connected through the parallelly connected combination of, resistor 55 and capacitor 54, and capacitor 56, to the junction of plate 42 of tube 40 and resistor 44. This junction is also connected through normally closed contact 94 to motor winding 110 which has substantially zero resistance to direct current and therefore this junction may be considered grounded.

When tube 90 is rendered conductive responsive to a channel selection signal from the transmitter, relay 95 operates and removes the D.-C. ground from the junction of plate 42 and resistor 44. At contact 96′, A.-C. source 100 is connected to motor winding 110 and to damping lead 99 to operate motor 120 and disable the control amplifier as described above. Since the ground is now removed from plate 42, capacitor 56 begins to charge through resistor 44 and maintains grid 93 of tube 90 positive for a predetermined maximum time period. Again, the time constant of this circuit is adjusted to allow tuner motor 120 to rotate the tuner through its complete tuning range before cutting off tube 90. In the presence of a television signal a negative pulse will appear at the junction of plate 42 and resistor 44 and will be coupled through capacitors 56 and 54 to grid 93 to cut off tube 90 and stop tuner motor 120.

What has been described is an improved control system for a television receiver which is remotely actuated to automatically tune the television set to the next succeeding "live" television channel. As described, the horizontal line synchronizing components of the received television signal are utilized to indicate the presence of a television signal and initiate a "stop" signal to the control system. The specific embodiments portrayed should not be construed as limitations of the invention as it is apparent that numerous modifications may be effected within its true spirit and scope as defined in the claims.

What is claimed is:

1. In a control system remotely actuated by control signals having predetermined characteristics; tunable receiving apparatus adapted to receive wave signals said wave signals including periodic reference components; control signal translation means; motive means mechanically coupled to said tunable receiving apparatus; operating means interposed between said translation means and said motive means, said operating means energizing said motive means in response to a control signal having said predetermined characteristics; holding means controlled by said operating means for holding said operating means operated for a fixed maximum period of time; and deenergizing means coupled between said receiving apparatus and said holding means for rendering said holding means ineffective in response to said periodic reference components in the wave signals in said tunable receiving apparatus said holding means releasing said operating means after said fixed maximum period of time in the event no wave signals having said periodic reference components are received by said tunable receiving apparatus.

2. A stopping circuit for use in receiving apparatus including a motor driven incremental type tuner adapted to sequentially tune a plurality of wave energy signals each having recurrent reference potentials, said motor being energized and de-energized responsive to conduction and nonconduction, respectively, in an electron valve coupled thereto, said receiving apparatus also including separating means for separating said recurrent reference potentials from said wave energy signals and means for initiating conduction in said electron valve to energize said motor and drive said tuner, said stopping circuit comprising; a tuned circuit tuned to an integral multiple of the frequency of recurrence of said reference potentials, said tuned circuit coupled to the load circuit of said separating means and energized by said reference potentials; means coupled to said tuned circuit for generating a trigger voltage responsive to energization of said tuned circuit; and means for applying said trigger voltage to said electron valve to terminatae conduction therein and stop said motor driver tuner.

3. In a television receiver of the signal seeking type wherein there is provided a tuner drivingly coupled to a motor, means including a relay and a relay tube for energizing said motor responsive to a start signal, and means for de-energizing said motor responsive to a stop signal developed when a television signal including recurrent synchronizing signals is tuned by said tuner, said television receiver including a synchronizing signal separator, the improvement in said last-mentioned means comprising; a tuned circuit coupled to said synchronizing signal separator and tuned to a harmonic of said recurrent synchronizing potentials; a stop signal detector including an electron discharge device having an input circuit coupled to said tuned circuit and an output circuit coupled to said relay tube, said discharge device being normally held nonconductive until energization of said tuned circuit; and means in said output circuit responsive to the change in conductive state of said discharge device for generating a voltage pulse of a polarity such to cut-off said relay tube and, de-energize said motor.

4. In a television receiver having a tuner for sequentially tuning a plurality of television signals each of which includes synchronizing components, means for separating said synchronizing components from said television signals, a motor for driving said tuner, motor starting means including a relay, an electron valve for controlling energization of said relay and means for initiating conduction in said valve, motor stopping means comprising, a tuned circuit coupled to said separating means, said tuned circuit tuned to an integral multiple of the frequency of said synchronizing components and energizable responsive to the separation thereof, trigger voltage generating means for generating a trigger potential responsive to energization of said tuned circuit, and means for coupling said trigger potential to said electron valve for terminating conduction therein.

5. In a television receiver as set forth in claim 4 wherein said motor starting means further includes a holding circuit having a predetermined maximum holding time, said holding circuit operable upon energization of said relay to maintain said electron valve conductive whereby said motor is stopped after passage of said predetermined maximum time in the absence of all of said plurality of television signals.

6. In a television receiver as set forth in claim 4 wherein said trigger voltage generating means comprises a second electron valve having an input circuit and an output circuit, said tuned circuit coupled to said input circuit and said output circuit including a load resistor and a capacitor, said second valve normally biased nonconductive and said capacitor normally charged to a first potential, said second valve rendered conductive upon energization of said tuned circuit, said capacitor responsive to conduction in said second valve rapidly assuming a potential different from said first potential, whereby said trigger voltage is generated.

References Cited in the file of this patent

UNITED STATES PATENTS

| | | |
|---|---|---|
| 2,890,274 | Guyton | June 9, 1959 |
| 2,910,530 | Clark | Oct. 27, 1959 |

OTHER REFERENCES

"Two New TV Remote Controls," Radio-Electronics, February 1957, pp. 42, 43 and 44.